Jan. 15, 1963   G. H. ECKELS   3,073,396
PORTABLE DERRICK WITH TELESCOPING FLUID TRANSMISSION LINES
Filed April 12, 1961   6 Sheets-Sheet 2

INVENTOR.
GEORGE H. ECKELS
BY
Teare, Felzer & Teare
ATTORNEYS

Jan. 15, 1963 G. H. ECKELS 3,073,396
PORTABLE DERRICK WITH TELESCOPING FLUID TRANSMISSION LINES
Filed April 12, 1961 6 Sheets-Sheet 4

INVENTOR.
GEORGE H. ECKELS

BY

Teare, Fetzer & Teare
ATTORNEYS

Jan. 15, 1963 G. H. ECKELS 3,073,396
PORTABLE DERRICK WITH TELESCOPING FLUID TRANSMISSION LINES
Filed April 12, 1961 6 Sheets-Sheet 6

INVENTOR.
GEORGE H. ECKELS
BY
Teare, Fetzer + Teare
ATTORNEYS 3,073,396
PORTABLE DERRICK WITH TELESCOPING
FLUID TRANSMISSION LINES
George H. Eckels, Lakewood, Ohio, assignor to Holan
Corporation, Cleveland, Ohio, a corporation of Ohio
Filed Apr. 12, 1961, Ser. No. 102,458
4 Claims. (Cl. 175—123)

This invention relates in general to derricks, and more particularly to a derrick or crane wherein the derrick boom may be selectively, and generally telescopically, extended and retracted, for adjusting the operating range of the derrick.

The derrick of the invention is illustrated as being of the portable type, mounted on a utility type vehicle, and one particularly adapted for handling and erecting various objects, such as telephone or telegraph poles.

In the co-pending United States Patent Application of George H. Eckels et al., Serial No. 15,298, filed March 16, 1960, there is disclosed a portable type derrick mounted on a utility type vehicle for handling various objects, and which derrick can be employed to advantage in conjunction with other types of equipment, such as an earth boring tool for, expeditiously performing all of the necessary work operations associated with setting a utility line pole in the proper place along a thoroughfare or the like. The derrick disclosed in such pending application comprises a sectional, extensible boom, and includes means on the boom for attaching an associated work mechanism, such as an earth boring tool, to the boom, and wherein means is provided in conjunction with the tool attaching means for selectively securing the associated work mechanism to either the extendible boom section, or the relatively stationary section of the boom, thereby greatly increasing the range of movement and the usability of the associated work mechanism. The work mechanism, or earth boring tool, of such an arrangement is conventionally driven by a fluid powered motor unit mounted on the transmission housing of the work mechanism, and therefore fluid transmission lines must be provided from a source of pressurized fluid generally located on the vehicle, to the motor unit of the work mechanism, for driving the motor unit and thus actuating the work mechanism. Heretofore, such fluid transmission lines have generally embodied hanging, flexible loop portions, so as to provide sufficient hose length for use when the earth boring tool is coupled to the extendible boom section and moves with respect to the relatively stationary boom section. These hanging loops, as well as being unsightly, are readily subject to damage, and at times interfere with the work operations.

The present invention provides a novel arrangement of telescoping fluid transmission lines which are mounted on the derrick boom, and which provide for the effective transmission of actuating fluid to the driving motor of the earth boring tool, irrespective of the supported position of the tool with respect to the boom.

Accordingly, an object of the invention is to provide an arrangement of reciprocal or extensible type derrick, having an improved arrangement of pressurized fluid transmission lines associated therewith.

Another object of the invention is to provide a novel arrangement of extensible fluid transmission lines for use in transmitting actuating fluid to a movable or adjustable fluid actuated motor mechanism.

A more specific object of the invention is to provide a portable type derrick including a sectional, extensible boom for telescopically varying the effective length of the boom, together with means on the boom for attaching an associated work mechanism, such as a fluid actuated earth boring tool thereto, and wherein said means and associated earth boring mechanism may be moved or positionally changed lengthwise of the boom, and wherein there is provided a novel extensible arrangement of fluid transmission lines, for facilitating the movement of the earth boring mechanism with respect to the boom.

Other objects and advantages of the invention will be apparent from the following description taken in conjunction with the accompanying drawings wherein:

FIG. 1 is a side elevational view of a utility truck employing an extensible type derrick, which embodies the instant invention. The carried position of the derrick on the vehicle is illustrated in full lines, with such full line showing illustrating such extensible boom in retracted condition; in dotted lines extending forwardly from such full line showing there is illustrated an extended condition of the derrick boom, and in dot-dash lines various load carrying positions of the derrick boom are illustrated, and partially in a diagrammatic manner, when the derrick has been swung rearwardly from carried position on the vehicle. The work mechanism or earth boring tool has been eliminated from the FIG. 1 showing in the interests of simplicity.

Figure 1:
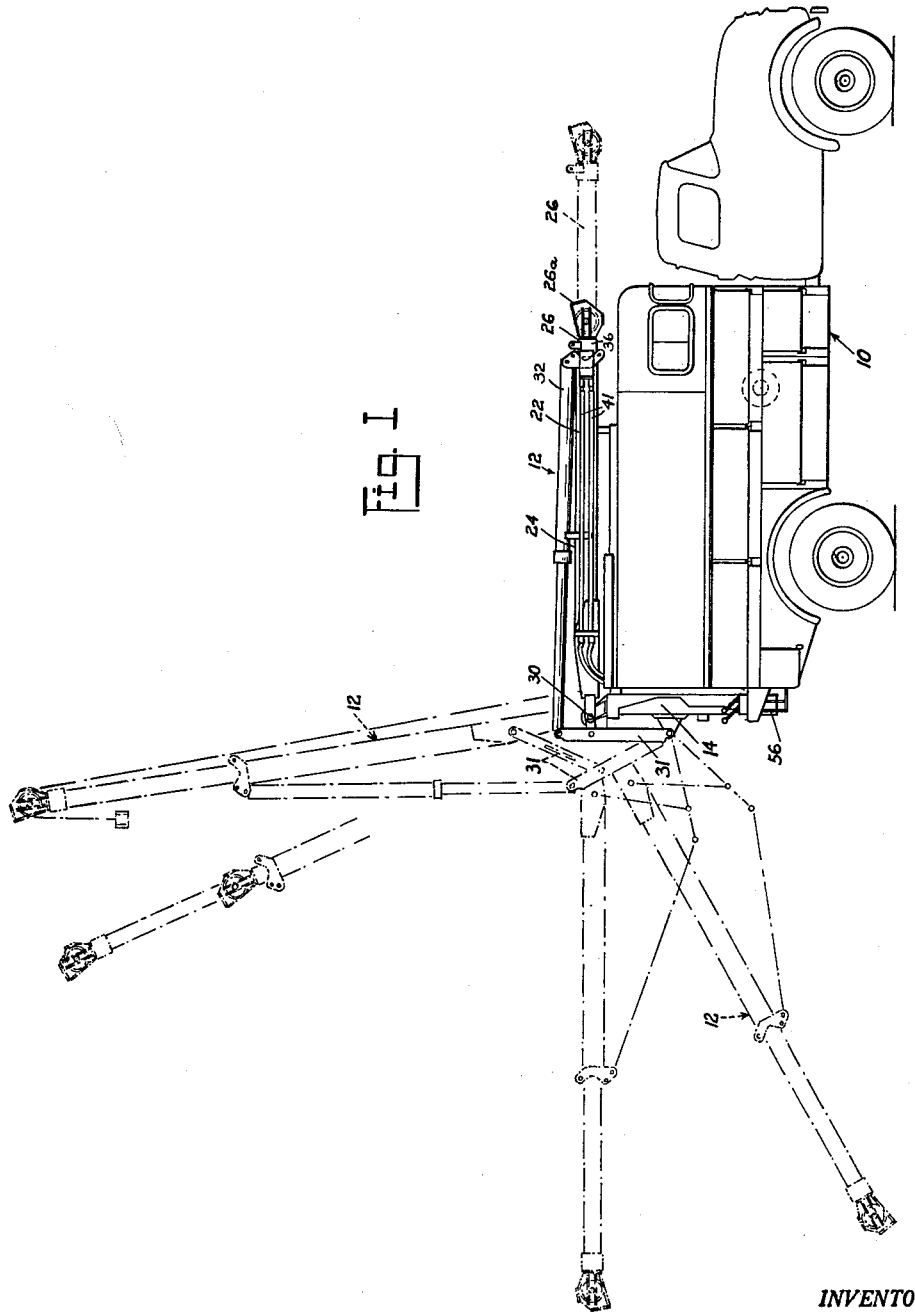
Figure 2:
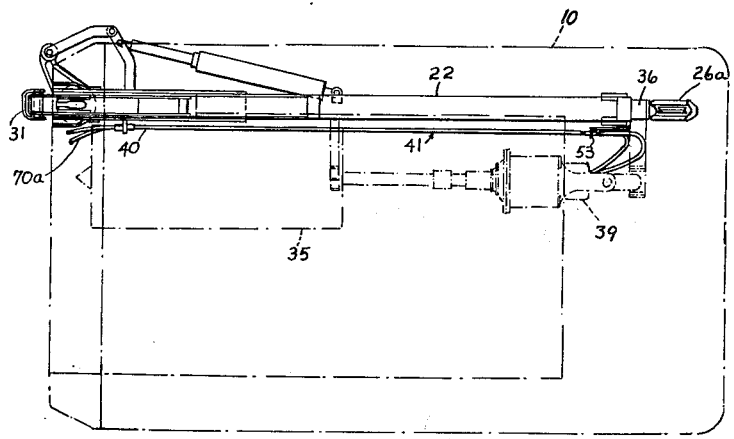
FIG. 2 is a top plan view of the derrick of FIG. 1 showing the same in inactive carried position on the vehicle, and showing in phantom lines an associated work tool, which in the embodiment illustrated represents a fluid actuated earth boring tool, secured to the derrick.

Referring now again to the drawings, and in particular to FIGS. 1 and 2, there is shown a wheeled utility vehicle 10 having a truck body which carries a derrick 12 thereon. The derrick boom 24 embodies an inner or lower, relatively stationary section 22, and also embodies an outer, extendible section 26, which may be received in telescoping relation in the lower or inner section 22 of the boom. Such outer extensible boom section 26 may mount a conventional sheave assembly 26a at its outer end. Suitable means may be provided for selective retraction and extension of the boom, such means being, for instance, a reciprocal, fluid powered motor unit mounted interiorly of the boom and in a manner known in the art.

The boom, in the embodiment illustrated, is pivotally mounted as at 30 to base structure 14, and a linkage erecting or actuating arrangement 31 is provided, together with a double-acting reciprocal fluid powered motor unit or ram 32, for moving the derrick in a generally vertical plane and through an arc of movement in excess 180°. Reference may be had to the aforementioned copending patent application, Serial No. 15,298 for a more detailed description of the derrick. It will be understood however, that the invention is not limited to such specific type of derrick, but is applicable for use with other types of mechanism or derricks, wherein the boom is of the extensible type.

Figure 10:
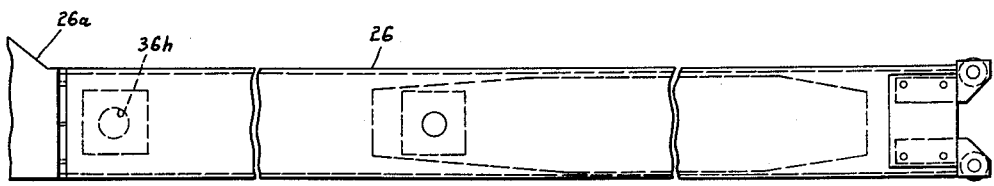
FIG. 10 is an enlarged, fragmentary, broken, side elevational view of the outer boom section, and which is adapted for telescoping movement in the inner boom section.

The earth boring mechanism 35 is selectively couplable to either the extendible section 26 of the boom, or to the relatively stationary section 22 of the boom. The arrangement for so accomplishing the latter may comprise a collar or tool supporting member 36 mounted on the extendible section 26 of the boom, and which is adapted for pivotal connection as at 37 to the transmission housing 38 of the earth boring tool 35. A latching arrangement 39A is preferably provided so that the supporting collar 36 for the work tool can be coupled to either the inner relatively stationary section 22 of the boom, or coupled to the extensible section 26 of the boom, to permit carrying of the work tool outwardly with the boom, and adjustment of the position of the work tool lengthwise with respect to the boom, for the full operating range of the boom extension. In other words, the outer boom section 26 is movable lengthwise relative to the tool supporting member 36. Reference may be had to the aforementioned pending patent application which specifically describes an arrangement for so movably mounting a work mechanism or earth boring tool on the boom. Briefly, however, the support member 36 may comprise a collar formed generally complementary to and in encompassing relation to the extendible section 26 of the boom, for receiving in relatively movable or sliding relation such extendible section 26 of the boom. The collar may embody an arm 36a projecting laterally outwardly from one side thereof and which may include attaching lugs 36b adjacent its outer end. Lugs 36b are apertured for receiving therebetween in pivotal relation the conventional supporting structure of the transmission mechanism 38 of the earth boring tool 35. The aforementioned latching mechanism 39A includes means for detachably locking the support member 36 to the extendible section 26 of the boom, when it is desired to carry the work tool and supporting member 36 with extension and retraction of the outer section 26 of the boom with respect to the inner section 22 thereof. Such locking means comprises a housing section 36c projecting laterally of the collar in a direction generally opposite to the direction of projection of arm 36a. A plunger 36d is slidably mounted in the housing and a compression spring 36e coacts between a head 36f on the plunger and the confronting wall 36g of the housing, to resiliently urge the plunger transversely and inwardly toward the collar and extendible section 26 of the boom. An opening 36h (FIG. 10) formed generally complementary to the head of the plunger 36d is formed in the confronting side of the extendible section 26 of the boom, for receiving the plunger head therein, and upon occurrence of the latter, the support member 36 and associated working tool will be locked to the extendible section 26 of the boom, and will be carried outwardly and inwardly therewith upon extension and retraction of the boom. Thus the working tool can be readily positioned lengthwise of the boom by locking the support member 36 to the extendible section 26 of the boom, and actuating the boom.

Figure 9:
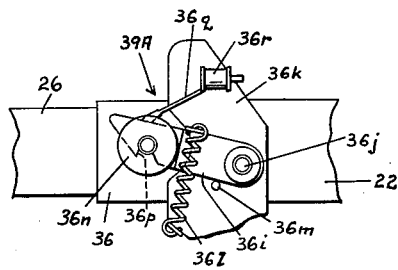
FIG. 9 is a fragmentary elevational view taken generally along the plane of line 9—9 of FIG. 8, and illustrating the latching mechanism for coupling the support member and associated earth boring tool to the inner boom section.

Other locking mechanism may be provided for detachably latching the support member 36 and associated working tool to the inner relatively stationary section 22 of the boom. Such locking or latching mechanism may comprise a latch member 36i pivoted as at 36j to supporting bracket 36k on the outer end of the inner section 22 of the boom, and a tension spring element 36l coacting between the latch 36i and the bracket, urges the latch member into latching position. A stop 36m (FIG. 9) is provided on bracket 36k for engagement with the latch, and limits its upward pivotal movement under the action of spring 36l. The latch 36i preferably comprises a sharpened or converging head portion adapted for camming coaction with a truncated lift cone element 36n mounted on the outer end of the plunger 36d, for automatically moving the plunger element laterally outwardly against the resistance to compression of the spring 36e, upon coating camming engagement between the head portion of the latch 36i and the inwardly converging cam surfaces of the truncated lift member 36n. It will be seen that the latch is provided with an upwardly opening slot 36p therein which receives the shank of the plunger, when the support member 36 is latched to the inner section 22 of the boom. A flexible element 36q, such as a cable, may be secured to the head of the latch member 36i and is passed through a spool 36r secured to bracket 36k, and then is strung to any convenient location, for ready accessibility to the derrick operator, to provide for deactivating the latch 36i and permitting the plunger to engage in complementary opening 36h in the extendible section 26 of the boom. It will be seen that by pulling on cable 36q, the latch 36i is pivoted downwardly out of latching engagement with the plunger 36d and against the resistance to tension of spring 36l, to thereby permit the spring 36e to urge the plunger head into opening 36h in the confronting side of the extendible section 26 of the boom thereby coupling the support member 36 to boom section 26. The resistance to tension of latch spring 36l is greater than the resistance to compression of the plunger spring 36e and therefore the plunger will normally be readily urged out of the complementary opening 36h in the outer boom section upon camming coaction between the head portion of latch 36i and cam member 36n. It will be seen, therefore, that the latch member 36i provides an arrangement whereby the work tool supporting member 36 and associated work tool will be automatically coupled to the inner, relatively stationary section 22 of the boom, upon retraction of the outer extendible boom section 26 into the inner relatively stationary section 22, to thereby permit subsequent extension of the boom without interference from the work tool, and for use as for instance in loading and unloading purposes, and which may be readily deactivated to cause coupling of the support member 36 and associated work tool to the extendible section 26 of the boom, to permit carrying of the work tool outwardly with the boom, and adjustment of the position of the work tool lengthwise with respect to the boom, for substantially the full operating range of the boom extension.

Figure 3:
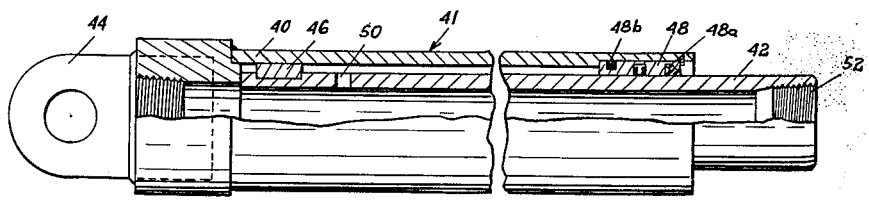
FIG. 3 is an enlarged, partially sectioned, broken view of one of the extensible fluid lines per se.
Figure 4:
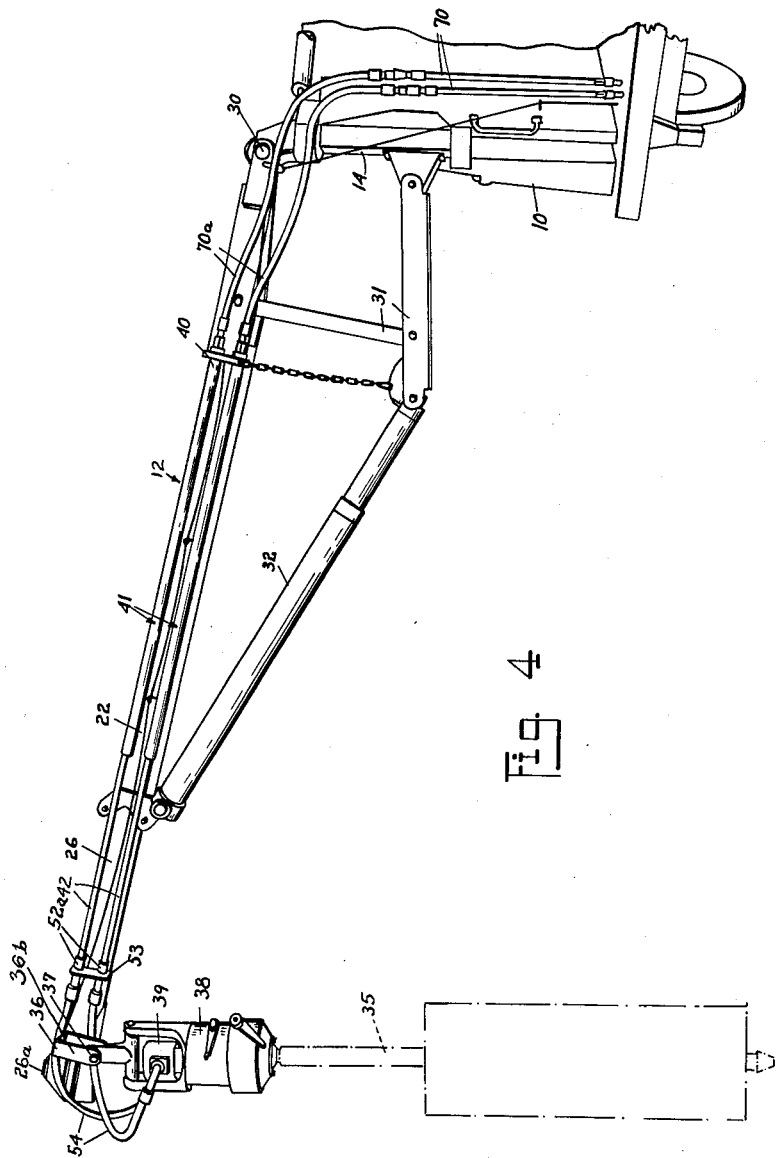
FIG. 4 is an enlarged, fragmentary side elevational view, showing the derrick boom in extended condition and carrying an earth boring tool adjacent the outer end of the boom, with the fluid transmission lines to the fluid actuated motor unit of the earth boring tool being likewise extended.

Now in accordance with the instant invention, there is provided a novel arrangement of telescopic or extensible fluid transmission lines 41 for transmitting pressurized actuating fluid from a source of supply, for instance on the vehicle, along the derrick boom and to the fluid driven, reversible motor unit 39 of the work mechanism 35, thus avoiding hanging loops of flexible hose that would conventionally be required to provide sufficient hose lengths for use when, for instance, the earth borer was coupled to the extensible boom section and moved outwardly therewith when the boom was extended. Such fluid transmission line mechanism takes the form of an outer tubular element 40 (FIG. 3) in which is received in telescoping relation an inner tubular element 42. The outer element 40 may be provided at one end thereof with an apertured ear portion 44 for ready attachment to, in the embodiment illustrated, the relatively stationary section 22 of the boom, and there is preferably provided a bearing bushing 46 attached to the inner element 42 and slidable with respect to the interior of the outer element, for effectively supporting the inner end of the inner element. Bushing 48 is also provided adjacent the other end of the outer element 40 and in coupled relation thereto, which bushing 48 is adapted to receive resilient sealing elements, such as a ring wiper 48a, an O-ring 48b, etc., in suitable grooves therein, for sealing the fluid within the elements during extension and retraction of the inner and outer elements. Inner element 42 is provided with an opening 50 therethrough, thereby providing a passageway for fluid between the interior of element 42 and the space between the inner element 42 and the outer element 41. The outer end of the inner element may be threaded, as at 52, and is adapted to be coupled to a corresponding coupling member or tube 52a mounted on a bracket 53 secured to support member 36. The coupling tube 52a is in turn connected to the motor unit 39 of the work mechanism as by means of a respective flexible distributing line 54, which in turn is connected to the corresponding one of the conventional distributing ports of the fluid powered motor unit 39.

Figure 5:
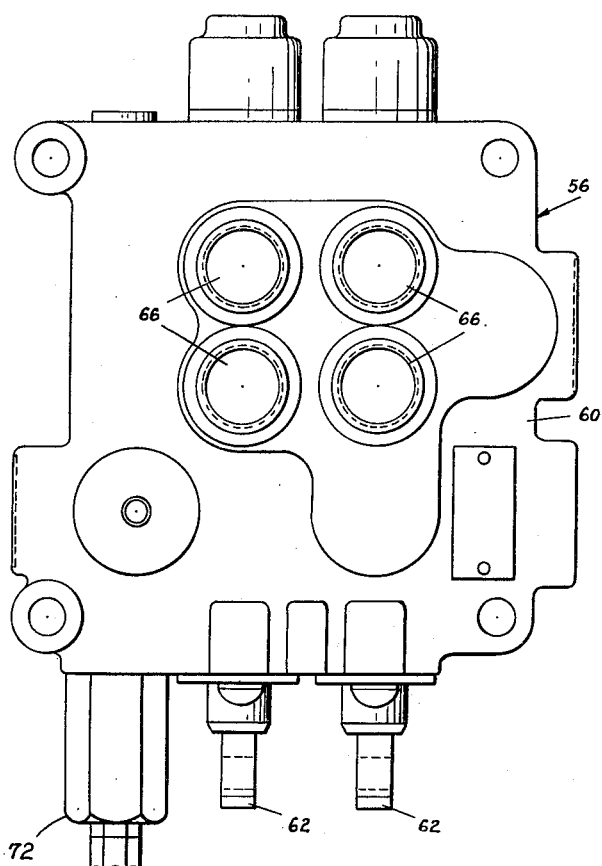
FIG. 5 is a side elevational view of a distributing valve useable for controlling the direction of flow of fluid through the extensible fluid transmission lines of the invention.
Figure 6:
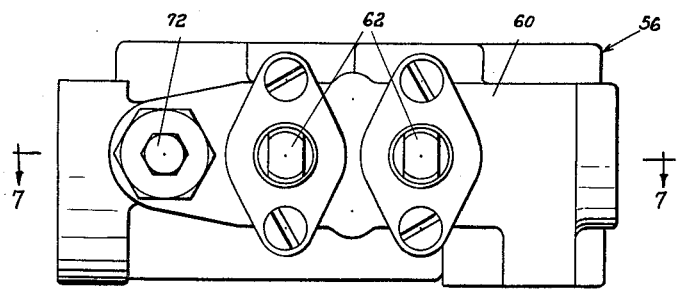
FIG. 6 is a bottom plan view of the FIG. 5 valve.
Figure 7:
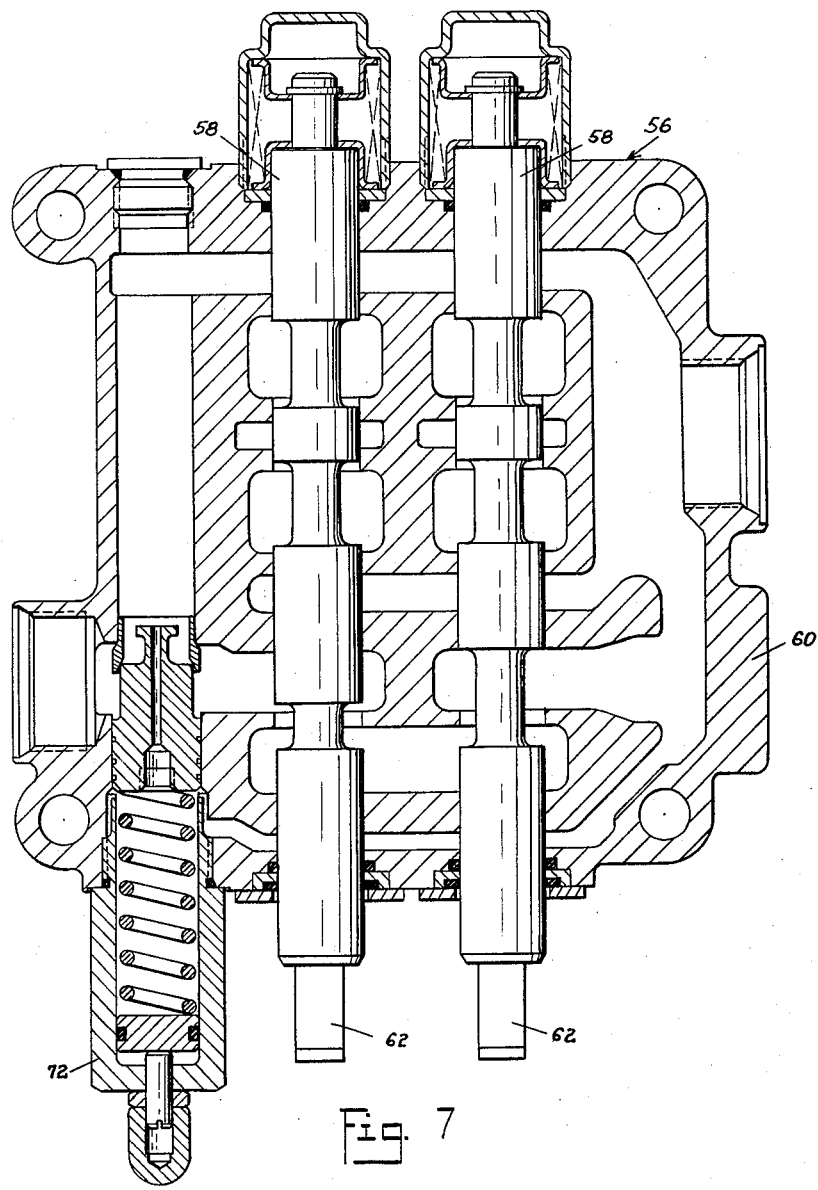
FIG. 7 is an enlarged, sectional view taken generally along the plane of line 7—7 of FIG. 6, looking in the direction of the arrows, and illustrating the internal organization of the directional control valve.
Figure 8:
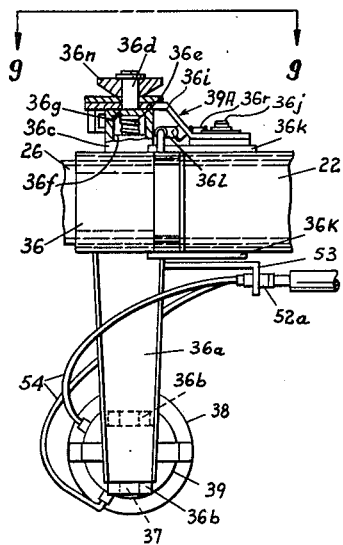
FIG. 8 is a fragmentary, partially sectioned, top plan view of the support member for mounting a work tool, such as an earth boring tool, on the outer boom section, and illustrating such supporting member being detachably coupled to the inner boom section, for sliding movement of the outer boom section with respect to the inner boom section and coupled supporting member.

There is provided on the vehicle body, valve mechanism 56 (FIGS. 5, 6 and 7) for controlling the direction of flow of fluid through the transmission lines 41 and thus for actuating the motor unit 39 in the desired direction. Such valve mechanism may take the form illustrated in FIGS. 5 to 7 of the drawings, wherein there is provided spring loaded reciprocal spools 58 mounted in the valve housing 60, which spools are controlled by actuation of handle elements exteriorly accessible on the vehicle, and connected by suitable linkage mechanism to the exposed shanks 62 of the spools, for lengthwise movement of the latter in the desired direction. It will be understood of course that only one spool is utilized to control the direction of flow of pressurized fluid through the transmission lines 41 to the motor unit 39, with the other spool being usable to control some other fluid driven motor unit utilized on the vehicle. In other words, for the purposes of the instant invention, the valve 56 could be a single spool rather than the double spool type illustrated. In any event, one pair of distributing ports 66, associated with each of the spools, are connected to the ends of the external tubular elements 41, and as by means of fluid transmission lines 70, which include flexible portions 70a, to permit movement of the derrick with respect to the vehicle. The valve preferably has a relief valve section 72 of conventional type for limiting the maximum fluid pressure in the valve, and inlet and outlet ports are provided in the valve body for connecting the pressurized fluid from the source to the valve and back to the source respectively. The valve is of the known type that when the spools are in neutral position (as shown in FIG. 7) there is provided free fluid communication between the two fluid transmission lines 41 and the reservoir on the vehicle thereby permitting free extension or retraction movement of the boom without any interference from the telescoping fluid transmission lines. In the latter neutral position, it will be understood, of course, that the distributing ports 66 of the control valve are blocked to pressurized fluid flow from the pump and in the conventional manner, with the pressurized fluid from the pump flowing through the valve and back to the reservoir.

From the foregoing discussion and accompanying drawings, it will be seen that the invention provides an improved arrangement of extensible derrick including extensible fluid transmission lines, for transmission of operating fluid to and from a fluid actuated work mechanism movable along the derrick boom, without requiring hanging loops of flexible hose that would ordinarily be required to provide sufficient hose length during lengthwise movement of the work mechanism with respect to the boom.

The terms and expressions which have been used are used as terms of description and not of limitation, and there is no intention in the use of such terms and expressions of excluding any equivalents of the features shown or described, or portions thereof, but it is recognized that various modifications are possible within the scope of the invention claimed.

I claim:
1. In a portable type derrick, comprising a boom, said boom comprising an outer section and an inner section, said outer section being adapted for relative lengthwise movement with respect to said inner section for varying the effective length of said boom, means on said boom for attaching an associated fluid motor actuated work mechanism, such as an earth boring tool, thereto, said last mentioned means comprising a work mechanism supporting member being slidable on said outer boom section, means for coupling said supporting member to said outer boom section, for movement therewith relative to said inner boom section, means for coupling said supporting member to said inner boom section for movement of said outer boom section relative to said inner boom section and coupled supporting member, and extensible fluid transmission line means mounted on said inner boom section and coupled to said fluid motor actuated work mechanism, said extensible line means comprising an inner tubular member and an outer tubular member, one of said tubular members being mounted on said inner section of said boom, the other of said tubular members being coupled to the first mentioned means, and being telescopically disposed for lengthwise movement with respect to said one tubular member, and means creating a fluid sealing relation between said relatively movable tubular members.

2. In a mobile derrick comprising a support, a boom mounted on said support, said boom comprising an inner section and an outer section, said outer section being adapted for relative lengthwise movement with respect to said inner section for varying the effective length of said boom, means on said boom for attaching an associated fluid actuated mechanism, such as a fluid motor driven earth boring tool, thereto, said last mentioned means comprising a work mechanism supporting member being slidable on said outer boom section, means for selectively coupling said supporting member to said outer boom section for movement of said supporting member with said outer boom section and relative to said inner boom section, extensible fluid transmission line means mounted on said inner boom section, one end of said line means being adapted for coupling to the fluid actuated mechanism, said extensible line means comprising an inner tubular member and an outer tubular member, one of said tubular members being mounted on said inner boom section and the other of said tubular members being coupled to the first mentioned means and being telescopically disposed for lengthwise movement with respect to said one tubular member, means creating a fluid sealing relation between said relatively movable tubular members for effective passage of pressurized fluid therethrough, valve means mounted on said support, the other end of said line means being operatively coupled to said valve means, said valve means including a movable control spool and being adapted for connection to a source of pressurized fluid including a reservoir and to control the application and the direction of flow of pressurized fluid to and from the fluid actuated mechanism, said valve means including means operable to provide free communication between said line means and the reservoir when said valve means is closed by said control spool to the passage of pressurized fluid to said line means, thereby permitting free relative lengthwise movement of the boom sections and associated tubular members without interference from fluid in the tubular members of said telescoping line means.

3. In a portable type derrick comprising a boom, said boom comprising an inner section and an outer section, said outer section being adapted for relative lengthwise movement with respect to said inner section for varying the effective length of said boom, means on said boom for attaching an associated fluid actuated mechanism such as a fluid motor driven earth boring tool thereto, said last mentioned means comprising a work mechanism supporting member slidable on said outer boom section, means for selectively coupling said supporting member to said outer boom section for movement of said supporting member with said outer boom section and relative to said inner boom section, and extensible fluid transmission line means mounted on said inner boom section and adapted for coupling to the fluid actuated mechanism, said extensible line means comprising an inner tubular member and an outer tubular member, one of said tubular members being mounted on said inner boom section and the other of said tubular members being coupled to the first mentioned means and being telescopically disposed for lengthwise movement with respect to said one tubular member, and means creating a fluid sealing relation between said relatively movable tubular members for effective passage of pressurized fluid therethrough.

4. In a portable type derrick comprising a boom, said boom comprising an inner section and an outer section, said outer section being adapted for relative lengthwise movement with respect to said inner section for varying the effective length of said boom, means on said boom attaching an associated fluid actuated mechanism such as a fluid motor driven rotary earth boring tool thereto, said last mentioned means comprising a work mechanism supporting member including a collar slidably mounted on said outer boom section and in encompassing relation thereto and an arm projecting generally laterally outwardly from one side of said collar, means on said arm for pivotally attaching the fluid actuated mechanism thereto, means for selectively coupling said supporting member to said outer boom section for movement of said supporting member with said outer boom section and relative to said inner boom section, means for coupling said supporting member to said inner boom section for movement of said outer boom section relative to said inner section and coupled supporting member, and extensible fluid transmission line means mounted on said inner boom section and being adapted for coupling to the fluid actuated mechanism, said extensible line means comprising a relatively rigid inner tubular member and a relatively rigid outer tubular member, said tubular members being telescopically disposed for relative lengthwise movement, one of said tubular members being mounted on said inner boom section, means on said arm of said support member projecting in the general direction of extension of said boom and coupling the free end of the other of said tubular members thereto, means creating a fluid sealing relation between said relative movable tubular members, and flexible line means coupling the free end of said other tubular member to the fluid motor of said fluid actuated mechanism.

References Cited in the file of this patent

UNITED STATES PATENTS

| | | |
|---|---|---|
| 982,836 | Ley et al. | Jan. 31, 1911 |
| 2,455,334 | Hill et al. | Nov. 30, 1948 |
| 2,887,092 | Brady | May 19, 1959 |
| 2,959,398 | Troche | Nov. 8, 1960 |